No. 789,256. PATENTED MAY 9, 1905.
A. J. CARTER.
ELECTRICAL TEST SET.
APPLICATION FILED DEC. 23, 1902. RENEWED APR. 4, 1905.
2 SHEETS—SHEET 1.
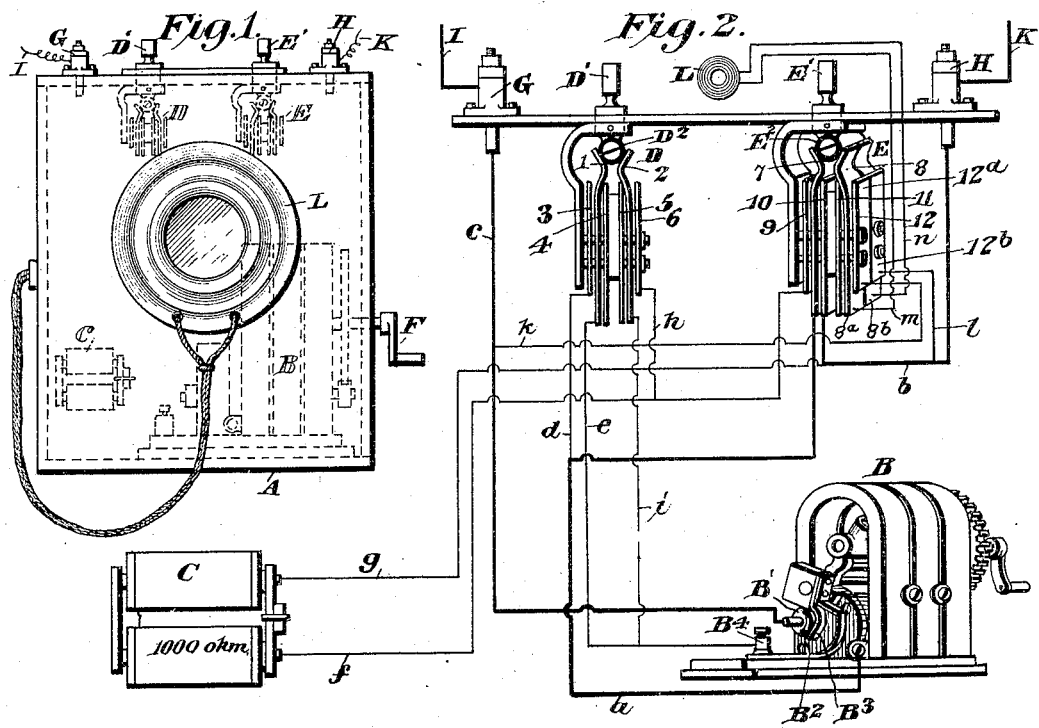
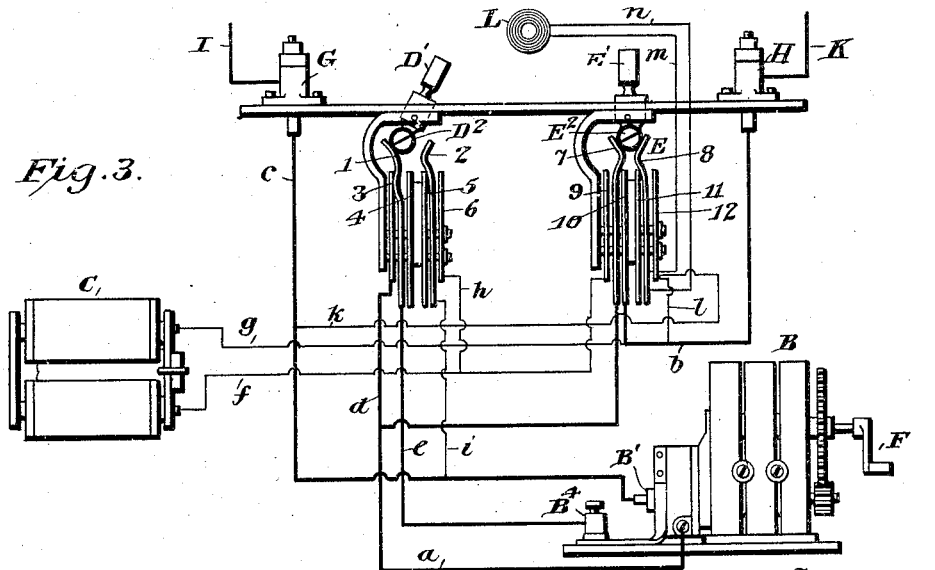
Alva J. Carter, Inventor No. 789,256. PATENTED MAY 9, 1905.
A. J. CARTER.
ELECTRICAL TEST SET.
APPLICATION FILED DEC. 23, 1902. RENEWED APR. 4, 1905.

2 SHEETS—SHEET 2.

Alva J. Carter, Inventor

Witnesses
Jas. K. McCathran
Louis G. Julihn

By E. G. Siggers
Attorney

No. 789,256.

Patented May 9, 1905.

UNITED STATES PATENT OFFICE.

ALVA J. CARTER, OF IDAGROVE, IOWA.

ELECTRICAL TEST SET.

SPECIFICATION forming part of Letters Patent No. 789,256, dated May 9, 1905.

Application filed December 23, 1902. Renewed April 4, 1905. Serial No. 253,757.

*To all whom it may concern:*

Be it known that I, ALVA J. CARTER, a citizen of the United States, residing at Idagrove, in the county of Ida and State of Iowa, have invented a new and useful Electrical Test Set, of which the following is a specification.

This invention relates to a novel test set designed with special reference to telephone-exchange work, but capable of being utilized for general test purposes in connection with telephone, telegraph, or other electrical systems.

The object of the invention is to produce in the smallest possible compass a simple and inexpensive testing apparatus lacking the usual batteries, transmitter, and similar appurtenances liable to damage and derangement by the rough usage which portable test sets necessarily receive.

A further object of the invention is to so organize the apparatus as to facilitate its employment in the conduct of a large range of tests requiring currents differing in character and a signal device connected in either series or multiple.

To the accomplishment of these objects and others subordinate thereto the invention in its preferred embodiment resides in that construction and arrangement of parts to be hereinafter described, illustrated in the accompanying drawings, and succinctly defined in the appended claims.

Figure 4:
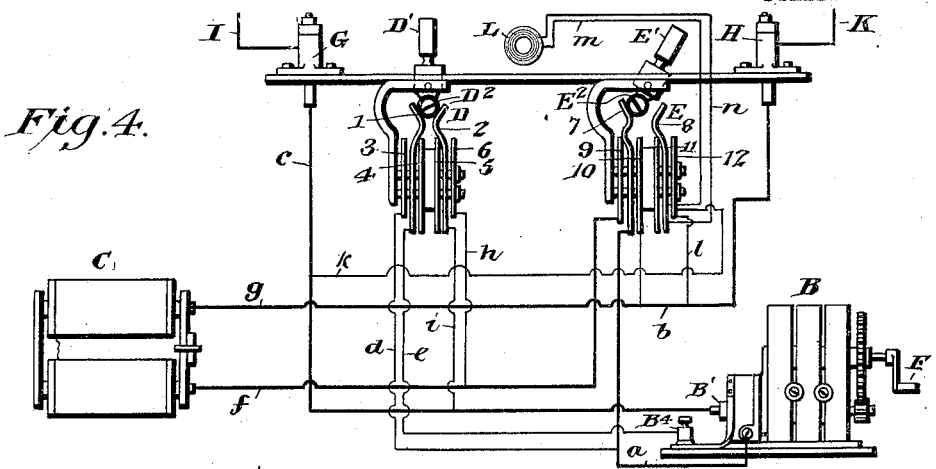
Figure 5:
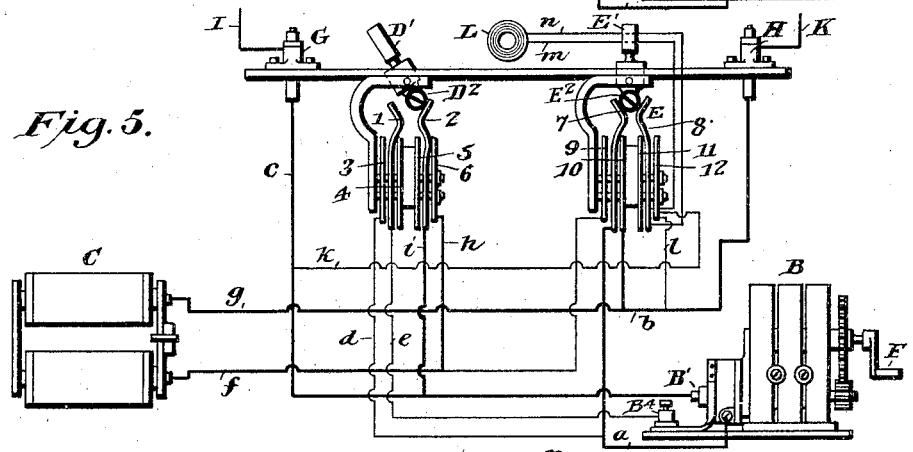
Figure 6:
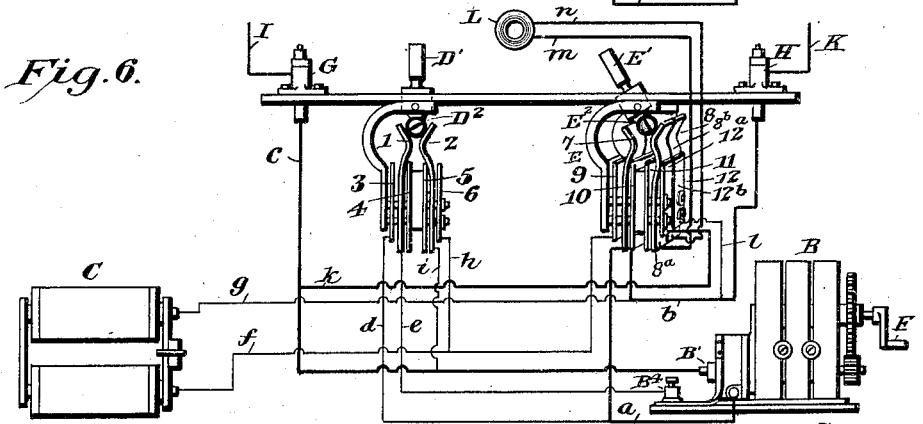

In said drawings, Figure 1 is an elevation of the complete test set, the parts located within the case being indicated in dotted lines. Fig. 2 is a diagrammatical view of the complete apparatus with the switches in proper positions to permit a strong alternating current to be sent out over the line being tested, live wires being indicated in heavy lines. Fig. 3 is a similar view showing the manner in which a shunt-circuit is closed for the purpose of eliminating the pulsations of one sign, and thereby producing a direct pulsating current over the line. Fig. 4 is a view in diagram showing the generator and the buzzer connected in series with the line. Fig. 5 is a similar view showing the manner in which the buzzer may be bridged across the line or connected in multiple with the generator, and Fig. 6 is still another diagrammatical view showing the complete receiver and transmitter connected to the line in a talking-circuit.

Like characters of reference are employed to designate corresponding parts throughout the several views.

Within a suitable case A of comparatively small size are mounted a generator B, a buzzer C, and two duplex switches D and E. The handle F of the generator is extended through one wall of the case for manual operation, and the pivoted switch-handles D' and E' are extended above the case for convenient manipulation. Upon the top wall of the case are secured the binding-posts G and H, to which when a test is being made are connected the line-wires I and K. Upon the front wall of the case A is supported by a suitable holder a high-wound watchcase-receiver L, which may also be employed as a transmitter in conducting a test in a talking-circuit. The generator, buzzer, receiver, switches, and binding-posts are connected by a system of wiring arranged within the case and clearly indicated in the several diagrammatical views.

The switch D includes a pair of contact-springs 1 and 2, between which is received the insulated roller $D^2$, operated by the handle D' to move either spring away from its normal position. (Shown in Fig. 2.) The spring 1 is disposed between the contact-plates 3 and 4, and the spring is similarly located between the plates 5 and 6, the several plates and springs being insulated from each other. Normally the contact-springs 1 and 2 are in contact with the upper ends of the inner contact-plates 4 and 5 and are out of contact with the plates 3 and 6. If, however, the handle D' is moved to the right, the spring 1 will be moved into contact with the plate 3 and if swung to the left the spring 2 will be urged similarly into contact with the plate 6, as shown in Fig. 5.

The construction of the switch E is identical with that of the switch D, the roller being indicated by $E^2$, the contact-springs by 7 and 8, and the several contact-plates by 9, 10, 11, and 12.

In switches of the character shown each of the contact plates and springs are composed of two sections insulated one from the other.

Except as to the spring 8 and plate 12 of the switch E, however, the sectional form of these parts is not material to the invention. It should be noted, however, that the spring 8 is composed of two longitudinally-disposed spring-sections $8^a$ and $8^b$, insulated from each other, and that the plate 12 is composed of sections $12^a$ and $12^b$, arranged opposite the sections of the spring.

The armature-disk B', connected to one terminal of the winding of the generator B, is provided at one side with an insulating-segment $B^2$, and coöperating with the disk is a brush $B^3$ in electrical connection with a binding-post $B^4$. The utility of this arrangement will be made apparent as the description of the wiring proceeds.

By reference to the diagrammatic figures it will be seen that one terminal of the generator-winding is connected through the frame of the generator with a wire $a$, leading to the contact-spring 7 of the switch E. A second wire $b$ is led from the contact-plate 10 to the binding-post H, which, as we have seen, is connected to one side of the line-circuit. From the other binding-post, G, a wire $c$ is led to the armature-disk B'.

The wire $a$ is tapped by a wire $d$, leading to the contact-plate 3 of the switch D, and the contact-spring 1 of said switch is connected by a wire $e$ to the binding-post $B^4$ of the generator. One side of the buzzer or signal coils is connected by a wire $f$ to the plate 9 of the switch E, and the other side or terminal thereof is similarly connected by a wire $g$ to the wire $b$. The wire $f$ is tapped by a wire $h$, leading to the plate 6 of the switch D, and the contact-spring 2 is connected by a wire $i$ to the wire $e$, which, it will be noted, constitutes a common return-wire for the system. The wire $c$ is also tapped by a wire $k$, leading to the section $12^a$ of the contact-plate 12 of the switch E, and the wire $b$ is tapped by a wire $l$, leading to the section $12^b$ of said plate. The sections $8^a$ and $8^b$ of the contact-spring 8 are connected to wires $m$ and $n$, leading to the terminals of the receiver L. This completes the description of the apparatus, and as the latter is capable of being utilized in connection with tests of various characters I shall proceed to indicate the nature of these several tests and shall trace out the circuits which are obtained to facilitate their conduct.

With the switch-handles in their normal or upright positions, as shown in Fig. 2, the apparatus is properly organized for the sending out of a strong alternating current which is particularly designed for the ringing of polarized bells on party or private lines when the set is used for telephone-exchange work. As indicated by the heavy lines in Fig. 2, the circuit is as follows: from one terminal of the generator-winding through the frame to the wire $a$, and contact-spring 7, the spring 7 being in contact with the plate 10, the circuit continues by way of said plate and the wire $b$ to the binding-post H, thence over the line-wires to ring the polarized bells, back to the binding-post G and through the wire $c$ to the other terminal of the generator.

If now it is desired to call the central office of a telephone-exchange without ringing the subscribers' bells, this may be done by throwing the switch-handle D' to the right, as indicated in Fig. 3, the effect of which will be to produce a direct pulsating current which will throw the annunciator-drop at the switchboard without calling the subscribers and without necessity for cutting the line in the usual manner. The throwing of the switch-handle D' as indicated will move the contact-spring 1 into contact with the plate 3 and will close a shunt from one terminal of the generator-winding through the frame, wires $a$ and $d$, plate 3, spring 1, wire $e$, brush $B^3$, and disk B' to the other terminal of the winding. By reason of the provision of the insulating-segment $B^2$ this shunt-circuit will only be effective to take off the impulses of one sign, and as a consequence instead of an alternating current a direct pulsating current of the character desired is sent out over the line to operate the drops without ringing the bells on the party-lines, and thereby calling up the subscribers.

In order to test party or private lines, it is desirable to include the coils of the buzzer or signal C in series with the generator and the instruments on the line. This is done by restoring the handle D' of the switch D to its normal position and by throwing the handle E' of the switch E to the right, as shown in Fig. 4. This will open the shunt-circuit heretofore described, will break the contact between the contact-spring 7 and the plate 10, and will make contact between the spring 7 and the plate 9. A circuit will therefore be induced as follows: from the generator-frame through the wire $a$ to the spring 7, thence to the plate 9, wire $f$, and one side or terminal of the buzzer or signal coils, thence from the other side thereof by wire $g$ to binding-post H, over the line, and return to binding-post G, and thence back to the other terminal of the generator by way of the wire $c$. If in testing a private line the buzzer (the resistance of which is one thousand ohms) does not ring, it indicates that the line is open. This provision for the connection of the signal in series is important for this character of test, because if it were bridged across the line or connected in multiple the signal would be sounded notwithstanding the open condition of the party-line.

It is necessary for the conduct of other tests that provision be made for bridging the buzzer or signal across the line instead of connecting it in series, as in Fig. 4—that is to say, in using the set for ground or short-circuit tests or bridging party-lines it is necessary to connect the buzzer or signal of the test set in multiple with the generator and subscribers' instruments. This arrangement may be secured in the following manner. (See Fig. 5:) The switch-handle E is first restored to its upright or normal position to move the contact-spring 7 out of contact with the plate 9 and into contact with the plate 10. The switch-handle D' is then swung to the left, moving the contact-spring 2 of the switch D into contact with the plate 6 of said switch. The circuit will then be from the generator, as in Fig. 2, as follows: wire *a* to spring 7, contact-plate 10, wire *b*, binding-post H, over the line and back to the binding-post G, thence to the other terminal of the generator by wire *c*. Across this circuit the buzzer or signal will be bridged and connected in multiple, one side of the line being connected to one terminal of the buzzer by the wire *g*, which taps the wire *b*, and the other terminal of the buzzer being connected to the other side of the circuit by way of the wires *f* and *h*, the contact-plate 6, spring 2, and wire *i*, the latter tapping the wire *c*. If in conducting a test of a bridged line the buzzer or signal bridged across the circuit, as indicated, does not sound, the line is either grounded or short-circuited.

In the last diagram, Fig. 6, is shown the disposition of the switches when a talking-circuit is desired. The switch-handle D' is restored to its normal position, and the switch-handle E' is swung to the left for the purpose of moving the contact-spring 8 into contact with the plate 12. The circuit will now be over the line by way of the wire *a*, spring 7, plate 10, wire *b*, binding-post H, wires *k* and *i*, binding-post G, and wire *c* to generator. Across the circuit thus formed will be connected the combined receiver and transmitter L. One terminal of the receiver is connected with one side of the line by way of wire *n*, spring-section 8ᵇ, plate-section 12ᵇ, and wire *l*, which latter taps the wire *b*, leading to the binding-post H. The other terminal of the receiver is connected to the other side of the circuit by wire *m*, spring-section 8ᵃ, plate-section 12ᵃ, and wire *k*, the latter tapping the wire *c*, leading from the binding-post G. With the parts thus arranged, the inspector having conducted the various tests may use the combined receiver and transmitter for the purpose of ascertaining whether the talking-circuit is in normal condition and may report the result of the tests to the central office. Of course where the set is used for the testing of systems other than telephone-exchanges further variations of the circuit may be secured in a manner obvious to those skilled in the art.

It will be observed from the foregoing that I have produced a simple, durable, and efficient test set of light weight and capable of being utilized in the conduct of a large variety of tests; but while the illustrated embodiment of the invention is thought at this time to be preferable I do not wish to be understood as limiting myself to the specific details recited, as, on the contrary, I reserve the right to effect such changes, modifications, and variations as may be fairly comprehended within the scope of the protection prayed.

What I claim is—

1. An electrical test set including a generator, an electromagnetic signal device, and switches wired to the line to connect the signal device and generator in either series or multiple.

2. An electrical test set including a generator, an electromagnetic signal device, switches wired to the line to connect the signal device and generator in either series or multiple, and means including one of said switches for commuting the alternating current of the generator to produce a direct pulsating current.

3. An electrical test set including electrical connections, a generator, an electromagnetic signal device, and means for commuting the alternating current of the generator to produce a direct pulsating current, said means including a shunt-circuit for shunting the induced impulses of one sign, and switch mechanism for opening and closing said shunt-circuit and for controlling the connection of the signal device with the generator.

4. An electrical test set including electrical connections, a generator, an electromagnetic signal device, and means for commuting the alternating current of the generator to produce a direct pulsating current, said means including a shunt-circuit for shunting the induced impulses of one sign, and switch mechanism for opening and closing said shunt-circuit and for connecting the signal device in either series or multiple with the generator.

5. An electrical test set including electrical connections, a generator, an electromagnetic signal device, a combined receiver and transmitter and a single switch device controlling the electrical connection of the signal device and receiver with the generator.

6. An electrical test set including electrical connections, a generator, an electromagnetic signal device, a combined receiver and transmitter and switch mechanisms for connecting the receiver and transmitter with the generator, and for connecting the signal device with said generator in either series or multiple.

7. An electrical test set including electrical connections, a generator for inducing an alternating current, means including a shunt-circuit for commuting the alternating current to produce a direct pulsating current, an electromagnetic signal device, a receiver and switch mechanisms for opening and closing the shunt-circuit and for effecting the electrical connection of either the receiver or signal device with the generator.

8. An electrical test set including electrical connections, a generator for inducing an alternating current, means including a shunt-circuit for commuting the alternating current to produce a direct pulsating current, an electromagnetic signal device, a receiver, and switch mechanism for opening and closing the shunt-circuit, for connecting the receiver with the generator and for connecting the signal device with the generator in either series or multiple.

9. An electrical test set including electrical connections, a generator for inducing an alternating current, means including a shunt-circuit for commuting the alternating current to produce a direct pulsating current, a receiver, a signal device and switch mechanism including a pair of switches, one of said switches serving to open or close the shunt-circuit or to connect the signal device in multiple with the generator, and the other switch serving to connect the receiver with the generator or to connect the signal device and generator in series.

10. An electrical test set including electrical connections, a generator, an electromagnetic signal device, a receiver, a pair of duplex switches controlling the electrical connections between the generator, signal device and receiver and a shunt-circuit controlled by one of said switches.

In testimony that I claim the foregoing as my own I have hereto affixed my signature in the presence of two witnesses.

ALVA J. CARTER.

Witnesses:
BLANCHE PERCIVAL,
H. A. MOOREHEAD.